United States Patent
Brubacher et al.

(10) Patent No.: US 6,818,240 B2
(45) Date of Patent: Nov. 16, 2004

(54) PROCESS FOR THE PRODUCTION OF MASA FLOUR AND DOUGH

(75) Inventors: Edward J. Brubacher, Liverpool (GB); Ansui Xu, Carmel, IN (US); Pablo Gaito, Carmel, IN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 10/681,633

(22) Filed: Oct. 8, 2003

(65) Prior Publication Data

US 2004/0142079 A1 Jul. 22, 2004

Related U.S. Application Data

(63) Continuation of application No. PCT/US02/10886, filed on Apr. 8, 2002.
(60) Provisional application No. 60/282,586, filed on Apr. 9, 2001.

(51) Int. Cl.$^7$ ................................................ A21D 8/00
(52) U.S. Cl. ...................... 426/496; 426/464; 426/560
(58) Field of Search ................................ 426/496, 464, 426/518, 549, 560

(56) References Cited

U.S. PATENT DOCUMENTS

| 4,645,679 A | 2/1987 | Lee, III et al. |
| 4,756,920 A | 7/1988 | Willard |
| 6,322,836 B1 * | 11/2001 | Rubio et al. ................ 426/464 |

* cited by examiner

*Primary Examiner*—George C. Yeung
(74) *Attorney, Agent, or Firm*—Paula A. DeGrandis

(57) ABSTRACT

This invention is directed to a continuous process for the production of flour and dough using ground corn kernels where before grinding the hull and tip cap are removed from the corn kernels which ground corn produces an endosperm/germ flour. The endosperm/germ flour then is moisturized and cooked with direct and indirect heat to gelatinize about 10 to about 50 weight percent of the starch in the flour.

9 Claims, 1 Drawing Sheet

PROCESS FOR THE PRODUCTION OF MASA FLOUR AND DOUGH

This application is a continuation of PCT/US02/10886, filed on Apr. 8, 2002, which is a continuation of U.S. Provisional Application No. 60/282,586, filed on Apr. 9, 2001.

FIELD OF THE INVENTION

The present invention relates to the making Masa flour and Masa dough from corn which has not undergone complete milling. More particularly, this invention is directed to the production of Masa flour and dough which is made by grinding non degermed corn and cooking the ground non degermed corn with indirect and direct heat.

BACKGROUND OF THE INVENTION

Masa Flour and Dough

Masa flour (dry corn flour which has usually been nixtamalized) and Masa (corn dough which has usually been nixtamalized) are raw materials which may be used for the preparation of tortillas, corn chips, tortilla chips, taco shells, nachos, snack foods and similar products.

Nixtamalization is the cooking of cereal grain, such as whole corn kernels, in a medium which usually contains an alkaline agent, such as water containing lime ($Ca(OH)_2$). Thereafter there is steeping (soaking) of the cereal grain for a period of time, for example, for about three to about fourteen hours, subsequent draining of any remaining cooking liquor, washing of the cereal grains, and grinding of the cereal grains to make with drying a cereal grain flour, which may be added with water to make a cereal grain dough from which tortillas and related products may be prepared.

The production of Masa dough with whole corn kernels produces large amount of waste water because of the large amounts of water needed to soften and hydrate whole kernels of corn. Further, subjecting whole kernels of corn to a complete milling process to produce corn germ, corn meal, and degermed corn endosperm requires expensive equipment and space for housing such equipment. This has been found unnecessary to produce Masa flour or dough used to make tortillas, tacos, tortilla chips, taco chips and other corn snack foods. Further, large consumers of Masa flour and dough would prefer their sources of flour nearby to avoid lengthy shipping, shipping delays and/or costs and would even consider milling corn themselves if they could avoid the cost of an entire milling operation as a precursor to making Masa dough and other corn food products from Masa flour. In view of the foregoing, it would be highly beneficial to reduce the waste water generally created in the batch processing of corn to make Masa flour and dough, but also to reduce the milling equipment generally required to mill corn for such Masa flour, reduce the space required to house such equipment and also increase the yield of Masa flour produced per unit of inputted corn used to make the Masa flour and dough from the corn.

OBJECTS OF THE INVENTION

An object of this invention is to provide a new high yield process for the production of Masa flour and dough.

Another object of this invention is to provide a continuous process for the production of Masa flour and dough which not only minimizes or completely eliminates the production of waste water, but also reduces the amount of equipment and space for milling whole corn used to make the Masa flour and dough.

These and other objects, advantages, features and characteristics of the present invention will become more apparent upon consideration of the following description and claims.

SUMMARY OF THE INVENTION

This invention is directed to the partial milling of whole corn, moisturizing the partially milled corn and then cooking the moisturized partially milled corn to partially gelatinize starch in the partially milled corn to provide a partially gelatinized Masa dough which then may be dried into a Masa flour. According to the invention, the corn is partially milled by separating portions of the hull or bran and tip cap of whole corn to provide a decorticated product which is primarily endosperm and germ. The decorticated corn then is ground to a flour having a particle size of at least about 40 U.S. mesh or larger mesh size (for a smaller particle size). Generally the endosperm/germ flour has from about 88 to about 92 endosperm and from about 8 to about 12 germ. The ground flour then is mixed with water to provide a moisturized flour having from at least about 25 weight percent moisture. The process of the invention conveniently eliminates a number of milling steps such as tempering of corn and multiple stages of grinding, and provides a high yield of Masa flour based upon the total amount of corn inputted into the process. This permits the use of less space for milling equipment that is generally required in the milling of corn. As a result, the invention permits the establishment of "mini-mills" which require only removal of the tip cap and the dehulling and debraning corn and subsequent grinding of the dehulled—debraned corn. After the moisturization of the ground dehulled—debraned corn to a level of at least about 25, and generally from about 27 to about 50, the moisturized ground corn is cooked with indirect and direct heat to cook and partially gelatinize the starch in the flour which consists essentially of endosperm and germ. In this partial gelatinization, from about 10 to about 50 weight percent of the starch in the endosperm/germ flour is gelatinized.

With the popularity of corn food products, such as Mexican foods including tacos, tortillas both hard and soft, and corn snack foods such as corn chips, large volumes of corn flour now are required by the manufacturing suppliers of such food products. Corn flour suppliers and milling operation can reduce their costs by moving closer to their customers, even locating adjacent to their customers which make, cook and deliver cooked food products to the customer. While theoretically possible, it is not practical or cost effective to build an entire cereal milling operation adjacent to a manufacturer of tortillas, tacos and/or corn chips. Such mills are not only large and expensive to build, but inventors have found complete cereal mills have milling operations which are superflubus to the production of most products which require corn flour and/or Masa dough. In view of the latter situation, the process of the invention permits an abbreviated milling of whole corn and the processing of the corn which has undergone only "partial" milling to provide a Masa dough or flour which is effective for providing a variety of cooked corn food products.

The process of the invention couples the partial or abbreviated milling of whole corn with the efficient cooking and partial gelatinization of starch in a corn endosperm/germ flour. The process of the invention is effective for permitting the continuous manufacture of Masa dough and flour for tortillas, tacos and a variety of corn snack products such as corn chips. The "post milling" portion of the process of the invention which includes the moisturization, cooking and partial gelatinization of the "partially milled" corn flour of the invention not only is effective for providing a continuous process for making the Masa flour and dough of the invention, but also is effective for reducing waste water generally required to make Masa dough at commercial volumes. Hence, space and equipment required to make Masa flour is reduced by only dehulling, debraning and grinding corn, but space and waste water also is reduced in wetting and cooking the ground endosperm/germ flour to make Masa dough according to the invention.

In an one aspect, during hydration, the corn endosperm/germ flour is mixed with water having a temperature of at least about 10° C., but not at a temperature that would substantially gelatinize the starch in the blend. Generally the temperature of the water/flour blend should not exceed about 60° C. The mixing of the water/flour blend should be effective to substantially, uniformly distribute water throughout the flour to the moisture level of the at least about 20 weight percent in the flour. In another aspect, the hydrated corn endosperm/germ flour has a moisture content of from about 20 to about 50 weight percent water, based upon the weight of the flour and water blend.

After hydration, the hydrated endosperm/germ flour is tempered for a time to equally distribute moisture throughout the flour. Generally, tempering times range from about 10 seconds to about 15 minutes, depending upon the type and the particle size distribution of the hydrated flour.

After tempering, the tempered hydrated flour enters a cooker to cook it in a cooking process which utilizes direct and indirect heat. The indirect heat keeps the cooker and dough at an elevated temperature which is effective for keeping the cooker clean of partially cooked residual dough. The direct heat, such as from the injection of steam into the tempered endosperm/germ flour, cooks the dough in combination with the indirect heat. The combination of indirect and direct heat brings the temperature of the tempered flour to a temperature of at least about 180° F. as it leaves the cooker and partially gelatinizes the starch in the endosperm/germ flour. After the partial gelatinization, not more than about 15 to about 50 weight percent of the starch in the endosperm/germ flour is gelatinized. The tempered endosperm/germ flour is directly exposed to steam for about 10 seconds to about 2 minutes, and preferably from about 15 to about 30 seconds, with the cooking temperature also potentially being affected by a subsequent drying step.

After cooking the partially gelatinized endosperm/germ flour may be dried to a moisture content of not more than about 15 weight percent, preferably to about 10 to about 13 weight percent, at a temperature which is effective for not heat damaging or burning the product. After drying the dried partially gelatinized product is sized, such as by milling and sifting to a particle size of from about 16 to about 100 mesh, depending upon what type of food product which will be made with the partially gelatinized endosperm/germ flour.

DETAILED DESCRIPTION OF THE INVENTION

Components of the Maize (Corn) Kernel

Figure 1:
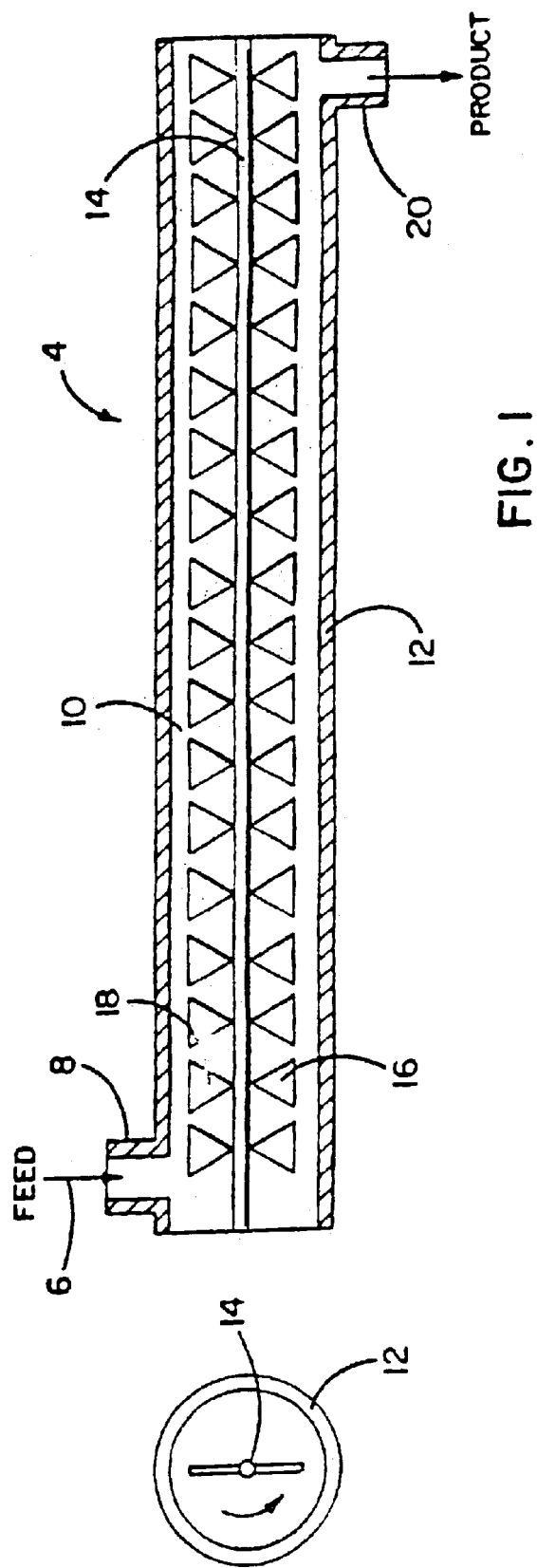
FIG. 1 is a schematic illustration of a cooker used in the process of the invention.

Botanically, a maize kernel is known as a caryposis, a dry, one-seeded, nut-like berry in which the fruit coat and seed are fused to form a single grain. Mature kernels are composed of four major parts: pericarp (hull or bran), germ (embryo), endosperm and tip cap. The average composition of whole maize, and its fractions, on a moisture-free (dry) basis is as follows:

| Fraction of Whole Maize | Kernel % | Starch % | Protein % | Liquid % | Sugar % | Ash % |
|---|---|---|---|---|---|---|
| Whole Grain | 100 | 71.5 | 10.3 | 4.8 | 2.0 | 1.4 |
| Endosperm | 82.3 | 86.4 | 9.4 | 0.8 | 0.6 | 0.3 |
| Germ | 11.5 | 8.2 | 18.8 | 34.5 | 10.8 | 10.1 |
| Pericarp | 5.3 | 7.3 | 3.7 | 1.0 | 0.3 | 0.8 |
| Tip cap | 0.8 | 5.3 | 9.1 | 3.8 | 1.6 | 1.6 |

Pericarp: The maize kernel is covered by a water-impermeable cuticle. The pericarp (hull or bran) is the mature ovary wall which is beneath the cuticle, and comprises all the outer cell layers down to the seed coat. It is high in non-starch-polysaccharides, such as cellulose and pentosans. (A pentosan is a complex carbohydrate present in many plant tissues, particularly brans, characterized by hydrolysis to give five-carbon-atom monosaccharides (pentoses). It is any member of a group of pentose polysaccharides having the formula $(C_5H_8O_4)_n$ found in various foods and plant juices.) Because of its high fiber content, the pericarp is tough.

Germ: The scutulum and the embryonic axis are the two major parts of the germ. The scutulum makes up 90% of the germ, and stores nutrients mobilized during germination. During this transformation, the embryonic axis grows into a seedling. The germ is characterized by its high fatty oil content. It is also rich in crude proteins, sugars, and ash constituents. The scutulum contains oil-rich parenchyma cells which have pitted cell walls. Of the sugars present in the germ, about 67%, is glucose.

Endosperm: The endosperm contains the starch, and is lower in protein content than the germ and the bran. It is also low in crude fat and ash constituents.

Tin cap: The tip cap, where the kernel is joined to the cob, is a continuation of the pericarp, and is usually present during shelling. It contains a loose and spongy parenchyma.

The process of the invention includes removing the hull or bran and tip cap from the whole corn kernel to provide a decorticated corn kernel having at least about 75 weight percent starch. Thereafter the decorticated corn is milled to a particle size of not more than about 60 U.S. Mesh. This milling may be done in a hammer mill as is known. The corn particles are sized in sifters as is known. After sizing the endosperm/germ flour is mixed with water and is hydrated to provide a hydrated flour which has a moisture content of at least about 20 weight percent. After hydration the process includes tempering the hydrated endosperm/germ flour to provide a tempered endosperm/germ flour, cooking the tempered flour with indirect heat and direct steam to gelatinize from about 10 to about 50 weight percent of the starch in the endosperm/germ flour. After cooking, the cooked product with the partially gelatinized starch may be used as a Masa dough or the cooked product is dried and optionally milled and sized to be later used as a Masa flour.

The particle size distribution of normally milled corn flour is as follows.

TABLE I

Percentages of Mesh Sizes

| Mesh Size | Corn Flour |
|---|---|
| >14 mesh | 0 |
| >16 mesh | 0 |
| >20 mesh | 0 |
| >40 mesh | 0.2 |
| >60 mesh | 5.6 |
| >80 mesh | 27.8 |
| >100 mesh | 19.4 |
| <100 mesh | 47 |
| | 100 |

The size of the milled product depends on the type of the application in which the Masa flour is to be used. In Table II set forth below, the percentage range of the mesh particle size of the use of the flour is shown in the columns of the Table I below.

TABLE II

Percentages of Mesh Sizes for Product

| Final Product Mesh Size | Chip | Taco | Tortilla | Snack Food |
|---|---|---|---|---|
| >16 mesh | 0–3 | 1–10 | 0 | 0 |
| >20 mesh | 10–26 | 10–35 | trace | trace |
| >40 mesh | n.a. | n.a. | –1.5 | trace |
| >60 mesh | 45 max. | 40 max. | 40 max. | 20–40 |
| <60 mesh | 65 max. | 55 max. | 75 max. | 65–80 |

Hydration Step

The endosperm/germ flour is mixed with water in a high-speed mixer. The temperature of the hydrating water varies between about 10° C. to about 50° C. depending upon the particle size distribution of the endosperm/germ flour. The time for the hydration can vary between 10 seconds and 15 minutes and this time also depending on the particle size distribution and the temperature of water used.

Any heating which results in substantial gelatinization of the corn starch during hydration in the flour should be avoided because such gelatinization will not provide a uniform final product for the cooking step. In this respect, substantial gelatinization means the starch granule structure is not disrupted and there is no loss of bifringency prior to cooking, such as more than about 5 percent weight percent of the starch in the blend is gelatinized.

The preferred mixer used during hydration is a turbulizer as supplied by Hosokawa Bepex, but other high-speed mixers available can be used. Mixing during hydration is important to substantially uniformly distribute water throughout the flour. Time is not critical as long as the moisture is substantially evenly distributed throughout the endosperm/germ flour to a moisture level of at least about 20 weight percent, in an important aspect, in a range of from about 23 to about 50 weight percent, and preferably about 26 to about 40 weight percent, based upon the weight of the hydrated flour.

During the hydration step, lime can be added dry with a separate feeder or with the water that is used for the hydration. Depending upon the desired final product the amount of lime mixed with the hydrated blend ranges from about 0.00 to about 1.0 weight percent of the hydrated blend.

Tempering

After hydration, the hydrated endosperm/germ flour is kept or tempered for a few minutes to make sure the moisture is equally distributed throughout all of the flour. This can be done by methods including the use of a standard transport screw or a tempering vessel. It is not essential, but advisable, to maintain a constant temperature during that process. Tempering times can vary between about 10 seconds and about 15 minutes. Long tempering times are not advisable as microbial growth can occur and are not required as the corn flour particles are small enough to make sure all the water is equally distributed throughout the product and a uniform mixture is obtained for the cooking.

Cooking

The cooker cooks with indirect and direct heat, such as a screw-type cooker and partially gelatinizes the starch in the endosperm/germ flour. This cooker, as shown in FIG. 1, is a elongated heating device which has a heat jacket surrounding a channel through which the tempered product is conveyed. The hydrated and tempered endosperm/germ flour is moved forward down the cooker by means of paddles on a hollow rotor in the device. The rotor is connected to a steam source to transmit steam to the paddles which are hollow and are open to receive steam from the rotor. Steam enters the rotor and is conveyed there through into the paddles which have one or more holes from which the steam is injected into the tempered product. The paddles uniformly distribute the steam in the product being cooked. Indirect heat is applied from the jacket of the device. The direct heat brings the tempered product to temperature, partially gelatinizing starch while the indirect heat keeps the cooker and dough at an elevated temperature which is effective for keeping the cooker clean of partially cooked residual dough. Cooking conditions are controlled through selection of a specific length for the device, the number of open steam holes in the paddles, the amount of indirect heat being applied and the rate the tempered flour is conveyed through the cooker.

Referring to FIG. 1 for more detail, the tempered endosperm/germ flour is fed into a elongated heating device 4 shown in FIG. 1. The tempered flour is fed into the heating device feed aperture 8 into channel 10. The tempered flour is conveyed down channel 10 in the y direction. Channel 10 is surrounded by a steam jacket 12 through which steam is circulated. A hollow rod 14 extends longitudinally down the center of the channel. A plurality of paddles 16 are mounted on the rod 14 down its longitudinal length. The rod 14 is rotated and the paddles are angled such that as the rod rotates the paddles mix, the tempered flour and push the flour down channel 10. The paddles have openings 18 that extend through the paddles to the hollow center of rod 14. These openings are to transmit steam going through the rod and paddles so that the steam may be injected into the flour being transmitted down channel 10. As the rod rotates the paddles push flour down the conduit to exit aperture 20 through which the cooked dough flows. The openings in the paddles may be opened or closed to control steam injection into the flour being transmitted down the channel. The amount of steam injected is effective for heating and cooking the flour such that a flour with partially gelatinized starch is obtained. Additional indirect heating of the tempered flour and the cooking channel is done by using indirect heat from the jacket of the device. Enough steam is injected to cook the tempered flour and gelatinize the starch therein and to provide the cooked product with a temperature of at least about 180° F., and generally from about 180 to about 205° F. A device which can be used to cook the tempered product as described herein is available as a Solidaire Model SJCS 8-4 from the Hosokawa Bepex Corporation, 333 N.E. Taft Street, Minneapolis, Minn. 55413.

The direct heat, such as from the injection of steam into the tempered product, cooks the dough in combination with the indirect heat. The indirect heat may be provided by steam or oil. The combination of indirect and direct heat brings the temperature of the tempered product to a temperature of at least about 180° F. as it leaves the cooker. The tempered product is directly exposed to steam for about 10 seconds to about 2 minutes, and preferably from about 15 to about 30 seconds, with the cooking time and temperature also potentially being affected by the temperature in the subsequent drying step. When lower temperatures are used during drying, higher temperatures are used during cooking and vice versa.

The cooking temperature as measured by the temperature of the product as it leaves the cooker is a function of the type of the product that is desired and the drying temperatures which are subsequent to the cooking step. When lower drying temperatures are used, such as a flash or a micron dryer, such as when the inlet temperature of the drier is 370° F., significant cooking in the dryer does not occur. When lower drying temperatures are used, the temperature of the cooked product as it leaves the cooker is in the higher end of the range of from about 200° F. to about 210° F. When higher temperatures are used, such as about 500° F. for inlet air temperature, and the temperature of the dried product exceeds 85° C., the cooked product leaves the cooker at the lower end of the latter range, about 180° F. to about 205° F. Overcooking will result in a sticky dough when further processing the Masa. During frying of the dough for making a product such as a taco shell, the oil will also be less released resulting in a more oily final product. Undercooking will result in that the formed dough after further processing the Masa is not cohesive and will not form the right final product. It will also give a more oily appearance to the fried products.

Before the cooking, hydrated corn products, such as the grits, can be added to the cooked, partially gelatinized corn flour product.

Drying

Conventional techniques, such as a flashdryer or belt dryer, can be used for drying the cooked mixture to provide a product with partially gelatinized starch and a product with a moisture level of not more than about 15 weight percent. Alternatively, a Micron dryer, as supplied by Hosokawa Bepex, may be used. In this system there is also a classifier system which mills the cooked product in such a manner that the right final granulation of the dried Masa is obtained for specific applications, such as tortilla and special corn snack foods. For applications where a coarser granulation is required, this air-classification system can be reduced to a minimal level to make sure that still the required coarse particles are present.

The temperatures used during the drying depend upon the temperatures and moisture used during cooking stage. If a high temperature is used during the cooking, a lower temperature can be used during the drying process. If lower temperature and lower moisture levels are used during the cooking, higher temperatures are used during the drying stage to make sure that some cooking is obtained during the drying step. However, a fine balance is kept to prevent the product from heat damage during the drying process. Such heat damage will result in a Masa which does not form a proper cohesive dough and which is discolored.

Hydrated corn particles as described in the raw mix can also be added before drying the cooked product. As such a specific balance can be obtained between the level of gelatinized starch in the product and fully hydrated corn particles.

The hydrated corn particles can also be dried in a different drying system (similar as described above) and in the dry form then added to the dried cooked product. Mixing before the drier is not essential.

Sizing of the Dried Product

The dried Masa is sifted on a standard sieve to obtain the right granulation. Coarse fractions can be removed and milled to a smaller granulation. Too fine product can be removed if necessary.

The follow examples describe and illustrate the process of the invention and the Masa flour and Masa dough prepared by the process of the invention.

What is claimed is:

1. A process for making partially cooked ground dehulled Masa dough, the process comprising:

removing hull and tip cap from whole corn to provide a decorticated corn;

grinding the decorticated corn to provide a ground decorticated corn;

mixing the ground decorticated corn with water to provide a moisturized milled decorticated corn having a moisture content of at least about 20 weight percent and;

cooking the moisturized ground decorticated corn with direct and indirect heat for a time and temperature which is effective for gelatinizing from about 10 to about 50 weight percent of the starch in the moisturized, ground decorticated corn to provide a partially gelatinized Masa dough.

2. The process as recited in claim 1 further comprising drying the partially gelatinized Masa dough to a moisture content of not more than about 15 weight percent moisture to provide a dried, cooked Masa dough.

3. The process as recited in claim 2 further comprising sizing the dried, cooked Masa dough to provide a sized cooked Masa dough having a particle size of from about 16 mesh to about 100 mesh.

4. A process as recited in claim 1 wherein the ground decorticated corn which is mixed with water is hydrated in the water for at least about 10 seconds at a temperature of at least about 10° C. to provide the moisturized milled decorticated corn prior to cooking the moisturized milled decorticated corn.

5. A process for making Masa dough from whole corn which process utilizes at least about 40 weight percent of the corn which is inputted to make the Masa dough, the process comprising:

removing hull and tip cap from whole corn to provide a decorticated whole corn without a hull and a tip cap, the decorticated corn having at least about 75 weight percent starch;

grinding the decorticated whole corn to a particle size of not more than about 100 U.S. Mesh to provide an endosperm/germ flour;

hydrating the endosperm/germ flour with water to a moisture level of at least about 20 weight percent, based upon the weight of the endosperm/germ flour and water to provide a hydrated endosperm/germ flour and;

cooking the hydrated endosperm/germ flour with indirect heat and direct heat to partially gelatinize starch in the flour such that from about 15 to about 50 weight percent of the starch in the flour is gelatinized to provide the Masa dough which if dried would provide a Masa flour yield of at least about 90%, based upon the weight of the Masa flour over the weight of the whole corn inputted to make such flour.

6. The process as recited in claim 5 wherein the decorticated corn has at least about 8 weight percent germ.

7. The process as recited in claim 6 further comprising drying the Masa dough to a moisture content of not more than about 15 weight percent moisture to provide a dried Masa flour.

8. The blend process as recited in claim 7 further comprising milling and sizing the dried Masa flour to a particle size of from about 16 mesh to about 100 mesh.

9. A process for making Masa dough from whole corn, the process comprising:

removing hull and tip cap from whole corn to provide a decorticated corn consisting essentially of endosperm and germ, the decorticated corn having at least about 75 weight percent starch and at least about 8 weight percent germ;

grinding the decorticated corn to a particle size of not more than about 100 U.S. Mesh to provide an endosperm/germ flour;

hydrating the endosperm/germ flour with water to a moisture level of at least about 20 weight percent, based upon the weight of the endosperm/germ flour and water to provide a hydrated endosperm/germ flour and;

cooking the hydrated endosperm/germ flour with indirect heat and direct heat to partially gelatinize starch in the flour such that from about 15 to about 20 weight percent of the starch in the flour is gelatinized to provide a Masa dough which if dried would provide a Masa flour yield of at least about 90%, based upon the weight of the Masa flour over the weight of the whole corn inputted to make such flour.

* * * * *

UNITED STATES PATENT AND TRADEMARK OFFICE
CERTIFICATE OF CORRECTION

PATENT NO. : 6,818,240 B2
DATED : November 16, 2004
INVENTOR(S) : Brubacher et al.

It is certified that error appears in the above-identified patent and that said Letters Patent is hereby corrected as shown below:

Column 8,
Lines 27 and 62, delete "and;" and insert -- ; and --.

Column 10,
Line 7, delete "and;" and insert -- ; and --.

Signed and Sealed this

Nineteenth Day of April, 2005

JON W. DUDAS
*Director of the United States Patent and Trademark Office*